United States Patent [19]
Paetzold

[11] 3,890,838
[45] June 24, 1975

[54] TUBULAR SWIRL FLOW METER
[75] Inventor: Wolf Paetzold, Hocheim, Germany
[73] Assignee: Elster AG, Mainz-Kastel, Germany
[22] Filed: May 16, 1974
[21] Appl. No.: 470,404

[52] U.S. Cl. ............................................. 73/194 B
[51] Int. Cl. ............................................. G01f 1/00
[58] Field of Search ..................... 73/194 B, 194 C

[56] References Cited
UNITED STATES PATENTS
3,616,693   11/1971   Burgess ............................ 73/194 C

*Primary Examiner*—James J. Gill
*Attorney, Agent, or Firm*—Darbo, Robertson & Vandenburgh

[57] ABSTRACT

The accuracy and range (in terms of the Reynolds numbers of fluids) of tubular swirl flow meters is increased by providing an annular shoulder in the measuring tube and mounting the measuring sensor within the zone of influence of the shoulder either upstream or downstream thereof.

5 Claims, 4 Drawing Figures

TUBULAR SWIRL FLOW METER

BACKGROUND AND SUMMARY OF THE INVENTION

The invention relates to a tubular swirl flow meter with at least one measuring sensor detecting the secondary rotation of the vortex core of the flowing fluid and swirl device arranged upstream of the measuring sensor for generating the secondary rotation.

Through Swiss Pat. No. 453,732 it is a known practice to set the medium flowing through the measuring tube in a turbulent state, to bring the turbulent medium into precession and to measure the frequency as well as the amplitude of the precession movement. For this purpose the swirl flow meter is to be provided with, among other things, the parts described above. As swirl device, the patent indicates turning vanes mounted in the upstream part of the measuring tube, or that this part of the inside of the tube is provided with windings or ribs. These ribs or windings must suffice to generate an effective turbulent flow up to or into the vicinity of the axis of the measuring tube.

There are known other swirl flow meters operating according to the same principle, but with additional means, of which there is mentioned by way of example German Pat. No. 1,904,435 and U.S. Pat. No. 3,314,289.

Underlying this measuring principle is the knowledge that between a turbulence frequency generated by a swirl device and the volume of fluid flowing through the measuring tube there exists a sufficiently precise linear relationship, it being possible to determine the linearity with the geometric form of the swirl device and the flow speed associated with it.

It has been proved that the linearity, however, is also influenced by the Reynolds number of the fluid to be measured. Known flow meters, therefore, have a sufficient linearity for a measuring instrument only within a certain Reynolds number range, which is restricted approximately to 1.2 to 1.3, a relatively limited range of usefulness. If with a swirl flow meter that is calibrated with a fluid having a certain Reynolds number, there is measured the flow of a fluid with a Reynolds number lying outside the range mentioned, then deviations of up to 10% are possible from the actual flow. This deviation has its cause in the change of the boundary layer thickness in dependence on the Reynolds number. As the Reynolds number increases the boundary layer thickness decreases whereby a minus error of the flow meter results through increase of the measuring cross section actively flowed through.

The general object of the present invention is to increase the calibratable measuring range of the swirl flow type of meter.

For the solution of the problem it is proposed according to the invention to make the boundary layer thickness, and in connection with this the actively flowed-through measuring cross section at the point of sensor measurement, entirely or very nearly independent of the Reynolds number. The solution consists in the provision of an annular shoulder in the measuring tube just upstream or just downstream from the measuring sensor. This shoulder, having a height approximately equal to the thickness of the boundary layer and being transverse to the main flow direction of the fluid stream, substantially nullifies the influence of variation of the Reynolds number of the fluid over a reasonable range of values.

Through this expedient the potential flow present in the outer boundary layer within the zone of influence of the annual shoulder is maintained very nearly constant for fluids having different Reynolds numbers. While at a low Reynolds number the velocity gradient determining the boundary layer thickness is low and the influence of the annular shoulder is minimal, at a high Reynolds number, which, as is well known, results in an increased velocity gradient, exerts maximum effect, since it essentially prevents a decrease of the range of the potential flow and thus influences the boundary layer thickness. The highest flow velocity in radial and axial directions occurs at the reduced cross section of the measuring tube at the annular shoulder whereby the tendency to stagnation is eliminated and false flow measurement values avoided. Thus, the potential flow in the outer boundary layer within the zone of influence of the annular shoulder is maintained virtually constant over a range of Reynolds numbers.

The annular shoulder may take on various forms. It has been found, however, that a shoulder having an acute angle cross section is most effective.

Besides the broadening of the measuring range, a special advantage of the invention lies in that the calibration constant of the meter for gases having low densities can be determined and this calibration constant retains its validity also for fluids having high gas densities, thus simplifying the calibration.

The invention is now explained with the aid of the drawing.

DESCRIPTION OF SPECIFIC EMBODIMENT

Figure 1:
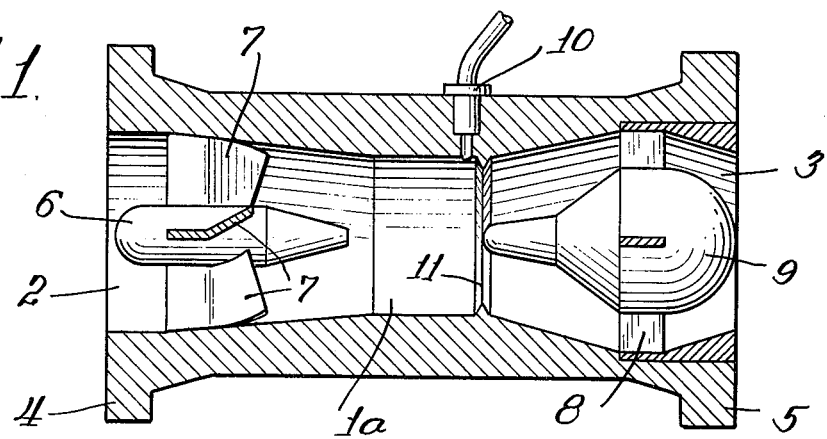
FIG. 1 is a cross-sectional view of the swirl flow meter of the invention.

The swirl flow meter as illustrated in FIG. 1 comprises a measuring tube 1 with entrance 2 and exit 3 which may be connected by means of flanges 4 and 5 in a pipe line, now shown. In the entrance 2 of the measuring tube 1 there is arranged a swirl device comprising a hub 6 with several guide vanes 7 radiating outwardly therefrom, and in the exit 3 there is arranged suitable straightening vanes 8 extending outwardly from hub 9 for again smoothing the flow. Between the swirl device and the straightening vanes there is mounted on the measuring tube 1 a measuring sensor 10 extending into the interior of the tube. The sensor may be any suitable type of known measuring device such as a thermistor or a pressure pick-up device such as a piezo-electric transducer.

In accordance with the invention, false readings at the sensor due to the boundary layer effect are avoided by providing a zone at the sensor in which the boundary layer is kept at a minimum throughout the range of Reynolds numbers of the fluid the flow of which is to be measured. This is accomplished by the provision of an annular shoulder 11 in the measuring tube near the sensing element. In the flow meter illustrated in FIG. 1, the downstream portion 1a of measuring tube 1 is cylindrical and the annular shoulder 11 is arranged just downstream from sensor 10, at the downstream end of the cylindrical portion of the measuring tube. Shoulder 11 may be integral with the measuring tube structure or it may be a separate ring securely mounted in the interior of the flow tube. It should be approximately the height of the thickness of the boundary layers of the fluid streams with which the meter is to be used and it is preferably formed with an acute angle at its inner circumference, as shown. Since the effect of the shoulder on the boundary layer is local, the sensor and shoulder are preferably located close to each other. However, it has been found that, depending upon a number of factors involved, such as the dimensions and form of the passageway at the shoulder, flow velocity, etc., the zone of influence of the shoulder 11 extends a short distance, empirically determinable, upstream and downstream from the annular shoulder. Thus, the sensor may be upstream from the shoulder as shown in FIG. 1 or downstream from the shoulder as shown in FIG. 2.

Figure 2:
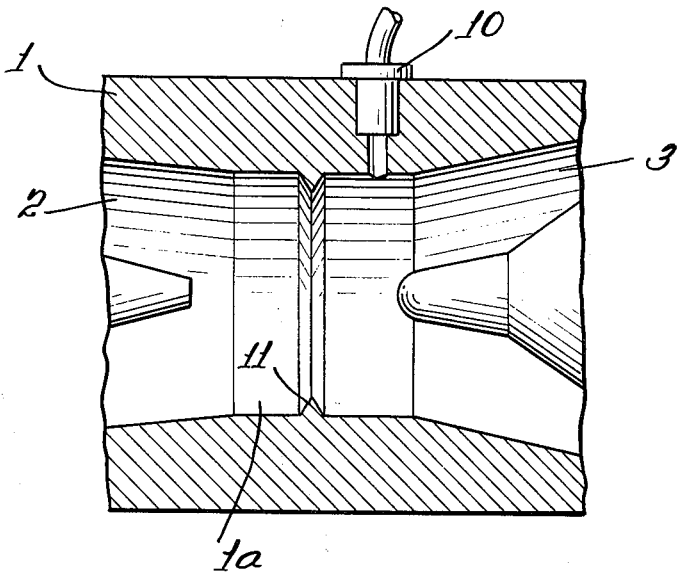
FIGS. 2, 3 and 4 are enlarged detail views in cross section showing alternative arrangements.
Figure 3:
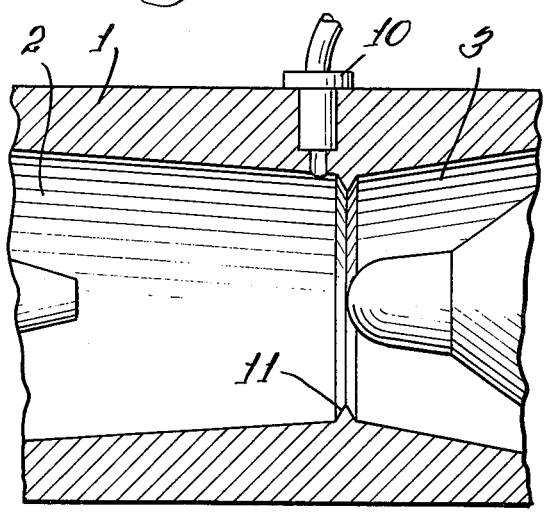
Figure 4:
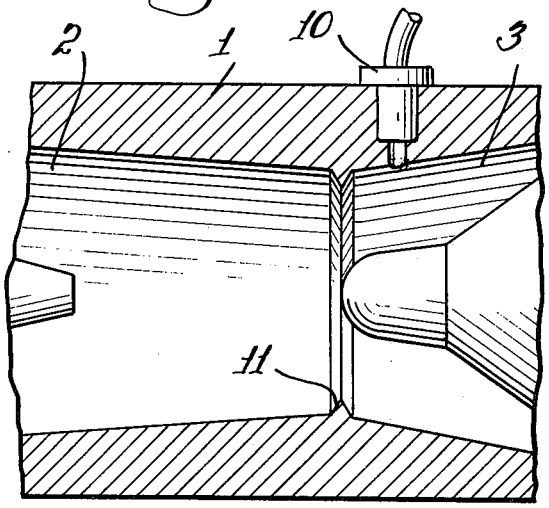

The meter structure shown in FIGS. 3 and 4 is a variant of that shown in FIGS. 1 and 2 in that the measuring tube upstream from annular shoulder 11 is conical without a cylindrical section 1a. Thus, the measuring tube converges to the shoulder then diverges toward the exit 3. The shoulder must be located at the junction of the conic sections, but, as is indicated in FIGS. 3 and 4, the sensor 10 may be either upstream or downstream from the shoulder.

I claim:

1. In a tubular swirl flow meter having a measuring tube, a swirl device at the entrance thereto and a measuring sensor downstream from the swirl device, the improvement wherein an annular shoulder is provided in the measuring tube near the sensor, the height of said shoulder being approximately equal to the normal thickness of the boundary layer for the flowing fluid having the smallest Reynolds number.

2. Structure in accordance with claim 1 wherein the sensor is upstream from and within the zone of influence of the annular shoulder.

3. Structure in accordance with claim 1 wherein the sensor is downstream from and within the zone of influence of the annular shoulder.

4. Structure in accordance with claim 1 wherein the measuring tube comprises a converging conical entrance followed by a cylindrical section and the sensor and annual shoulder are located in said cylindrical section.

5. Structure in accordance with claim 1 wherein the measuring tube comprises a converging conical entrance followed by a diverging conical exit section, the annular shoulder being located at the junction of the conical entrance end of the conical exit.

* * * * *